US006563776B1

(12) United States Patent
Oi et al.

(10) Patent No.: US 6,563,776 B1
(45) Date of Patent: May 13, 2003

(54) INFORMATION STORAGE APPARATUS FOR MONITORING A NUMBER OF DEFECTIVE SECTORS INCLUDED IN A ZONE SO AS TO SELECT A SUBSTITUTIONAL AREA FROM A DIFFERENT ZONE

(75) Inventors: Toshiyuki Oi, Kawasaki (JP); Masaoki Ohtsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/282,228

(22) Filed: Mar. 31, 1999

(30) Foreign Application Priority Data

Jul. 10, 1998 (JP) .......................................... 10-196012

(51) Int. Cl.⁷ ................................................ G11B 7/00
(52) U.S. Cl. ................................ 369/53.15; 369/53.17; 369/47.14
(58) Field of Search .......................... 369/47.14, 53.13, 369/275.13, 116, 53.17, 275.3, 275.4, 59.25, 30.07, 53.15, 53.24, 30.11; 360/48, 72.1; 714/710, 8

(56) References Cited

U.S. PATENT DOCUMENTS

| | | | | |
|---|---|---|---|---|
| 5,111,444 A | * | 5/1992 | Fukushima et al. | 369/30.07 |
| 5,271,018 A | * | 12/1993 | Chan | 360/48 |
| 5,319,627 A | * | 6/1994 | Shinno et al. | 369/30.07 |
| 5,453,974 A | * | 9/1995 | Minoda et al. | 369/275.3 |
| 5,513,166 A | * | 4/1996 | Tokumitsu et al. | 369/53.15 |
| 5,715,221 A | * | 2/1998 | Ito et al. | 369/47.14 |
| 5,914,928 A | * | 6/1999 | Takahashi | 369/275.3 |

FOREIGN PATENT DOCUMENTS

| | | |
|---|---|---|
| JP | 2-179970 | 7/1990 |
| JP | 4-3367 | 1/1992 |
| JP | 9-82036 | 3/1997 |

* cited by examiner

Primary Examiner—Paul W. Huber
Assistant Examiner—Kim-Kwok Chu
(74) Attorney, Agent, or Firm—Greer, Burns & Crain, Ltd.

(57) ABSTRACT

In an information storage apparatus, a substitution process for substitutionally storing information, when an error occurs in storing the information is prevented from being repeatedly performed with a substitutional area defined in the same recording zone, so that wasteful execution of the substitution process is prevented. The information storage apparatus stores information on a recording medium having a plurality of recording zones, each of the recording zones being divided into a plurality of sectors. A substitutional area is defined in each of the recording zones so as to substitutionally store information when an error occurs in storing the information. A defective sector detecting unit detects a defective sector in each of the recording zones. A control unit controls an operation for storing information so as to store the information, when a number of defective sectors included in a first one of the recording zones is greater than a predetermined value, in the substitutional area of a second one of the recording zones other than the first one of the recording zones in which the information is to be stored. The predetermined number is smaller than a maximum number of defective sectors includable in the substitutional area.

10 Claims, 19 Drawing Sheets

FIG. 6

| AREA | START POSITION | | END POSITION | |
|---|---|---|---|---|
| | TRACK NO. | SECTOR NO. | TRACK NO. | SECTOR NO. |
| FIRST DEFECT MANAGING AREA (DMA1) | 0 | 0 | 0 | 10 |
| RESERVED | 0 | 11 | 1 | 16 |
| SECOND DEFECT MANAGING AREA (DMA2) | 2 | 0 | 2 | 10 |
| THIRD DEFECT MANAGING AREA (DMA1) | 368839 | 0 | 368839 | 10 |
| RESERVED | 368839 | 11 | 368840 | 16 |
| FOURTH DEFECT MANAGING AREA (DMA2) | 368840 | 0 | 368841 | 10 |

FIG. 7

DISK MAP DATA (DMD)424

| ZONE NO. | NUMBER OF DATA SECTORS | NUMBER OF SPARE SECTORS | NUMBER OF SPARE LOGICAL TRACKS |
|---|---|---|---|
| 0 | 43911 | 153 | 9 |
| 1 | 42840 | 153 | 9 |
| 2 | 41769 | 153 | 9 |
| 3 | 40690 | 153 | 9 |
| 4 | 39627 | 136 | 8 |
| 5 | 38556 | 136 | 8 |
| 6 | 37485 | 136 | 8 |
| 7 | 36414 | 136 | 8 |
| 8 | 35343 | 119 | 7 |
| 9 | 34272 | 119 | 7 |
| 10 | 33201 | 119 | 7 |
| 11 | 32130 | 119 | 7 |
| 12 | 31059 | 119 | 7 |
| 13 | 29988 | 102 | 6 |
| 14 | 28917 | 102 | 6 |
| 15 | 27846 | 102 | 6 |
| 16 | 26775 | 102 | 6 |
| 17 | 25704 | 85 | 5 |

OUTER (zone 0) → INNER (zone 17)

| MEDIUM TYPE | TEMPERATURE | THRESHOLD VALUE |
|---|---|---|
| 128MB | LOW | N1 |
| | MEDIUM | N2 |
| | HIGH | N3 |
| 230MB | LOW | N11 |
| | MEDIUM | N12 |
| | HIGH | N13 |
| 540MB | LOW | N21 |
| | MEDIUM | N22 |
| | HIGH | N23 |
| 640MB | LOW | N31 |
| | MEDIUM | N32 |
| | HIGH | N33 |
| 1.3G | LOW | N41 |
| | MEDIUM | N42 |
| | HIGH | N43 |

INFORMATION STORAGE APPARATUS FOR MONITORING A NUMBER OF DEFECTIVE SECTORS INCLUDED IN A ZONE SO AS TO SELECT A SUBSTITUTIONAL AREA FROM A DIFFERENT ZONE

BACKGROUND OF THE INVENTION

1. Field of the Invention

The present invention generally relates to an information storage apparatus and, more particularly, to an information storage apparatus which records information on a disk-like recording medium having a plurality of zones each of which includes an alternating area to be substituted for a defective sector in which an error occurs.

A constant angular velocity (CAV) method is generally used for a disk drive apparatus which records information on a disk-like recording medium such as a magneto-optical recording medium or a phase-change optical recording medium. However, in recent years, zone constant angular velocity (ZCAV) method has become popular. In the ZCAV method, a recordable area of a disk-like recording medium is divided into a plurality of zones in a radial direction of the disk-like recording medium so that an angular velocity of the disk-like recording medium is changed between an operation performed on a zone located on an inner side and an operation performed on a zone located on an outer side of the disk-like recording medium.

Since a fixed number of sectors are provided in a physical track according to the CAV method, a recording density in a circumferential direction of the disk-like recording medium is decreased as recording operation progresses from an inner part toward an outer part of the disk-like recording medium. On the other hand, in the ZCAV method, since the recording area is divided into a plurality of zones in a radial direction so that an angular velocity can be set on an individual zone basis, a relatively constant recording density can be obtained irrespective of whether a recording operation is performed on an inner side or an outer side of the disk-like recording medium. Thus, the ZCAV method can achieve a higher recording density than the CAV method. However, such a high-density recording by the ZCAV method may create a defect in recorded information.

2. Description of the Related Art

In order to solve the above-mentioned problem, a conventional information storage apparatus such as a magneto-optical (MO) drive uses an alternating process. FIG. 1 is a flowchart for explaining a conventional substitution process. FIG. 2 is an illustration for explaining the conventional substitution process shown in FIG. 1.

In FIG. 1, it is assumed that an error occurs, in step S1-1, during an operation for writing information in a sector in a zone Z(N) (N=1, 2, 3, . . . ). It is determined, in step S1-2, whether there is an empty substitutional area AN in the zone Z(N) in which the information is to be written. If there in an empty substitution zone AN in the zone Z(N), the routine proceeds to step S1-3 so as to write the information in the empty substitutional area AN in the zone Z(N). On the other hand, if there is no empty substitutional area in the zone Z(N), the routine proceeds to step S1-4 so as to write the information in an empty substitutional area in the proceeding zone Z(N+1). This process is referred to as the substitution process.

However, the above-mentioned alternating process is not always effective when the ZCAV method is used. In the ZCAV method, since a high-density recording in a circumferential direction is performed, a margin with respect to a laser power or a magnetic field for recording is small. Accordingly, an error may easily occur on an outer side of a zone due to the small margin which is inherent to the ZCAV method. In such a case, an error may continuously occur even when the above-mentioned substitution process is performed.

As mentioned above, according to the conventional substitution process, when a defective sector is generated, the defective sector is first substituted by a substitutional area existing in the zone in which the defective sector exists. If all the substitutional areas in that zone have already been used for the alternating process, a substituting area in an adjacent zone is used.

Japanese Laid-Open Patent Application No. 9-82036 and Japanese Laid-Open Patent Application No. 4-3367 discloses a method for recording information in an alternating area adjacent to a zone of which all alternating zones have been used.

However, in the conventional information storage apparatus of the above-mentioned type, there is a high possibility that the substitution process is repeatedly performed with empty substitutional areas contained in the same zone since one of the substitutional areas to be used is selected from among substitutional areas contained in the zone which has a higher possibility to generate a defective sector.

Accordingly, it is possible that all of the substitutional areas in the same zone are consecutively used one by one. In such a case, there is a problem in that an access time for the disk-like recording medium exceeds a predetermined time given by an operation system since the substitution process is repeated many times until all of the substitution process have been used. Additionally, the number of substitution process is increased and a number of defective sectors is also increased in a short time.

SUMMARY OF THE INVENTION

It is a general object of the present invention to provide an improved and useful information storage apparatus in which the above-mentioned problems are eliminated.

A more specific object of the present invention is to provide an information storage apparatus in which a substitution process for substitutionally storing information when an error occurs in storing the information is prevented from being repeatedly performed with a substitutional area defined in the same recording zone so that wasteful execution of the substitution process is prevented.

In order to achieve the above-mentioned objects, there is provided according to the present invention an information storage apparatus adapted to store information on a recording medium having a plurality of recording zones, each of the recording zones being divided into a plurality of sectors, a substitutional area being defined in each of the recording zone so as to substitutionally store information when an error occurs in storing the information, the information storage apparatus comprising:

a defective sector detecting unit detecting a defective sector in each of the recording zones; and a control unit controlling an operation for storing information so as to store the information, when a number of defective sectors included in a first one of the recording zones is greater than a predetermined value, in the substitutional area of a second one of the recording zones other than the first one of the recording zones in which the information is to be stored, wherein the predetermined number is smaller than a maximum number of defective sectors includable in the substitutional area.

According to the present invention, if the predetermined number of defective sectors is generated in the one of the recording zone, it is determined that the one of the zone has a possibility of frequently generating a defective sector. Accordingly, the information to be recorded in the one of the zone after the number of defective sectors reach the predetermined value is stored in the substitutional area of another of the recording zones. Thus, the substitution process is prevented from being repeatedly performed in the one of the recording zones. This eliminates wasteful execution of the substitution process, and achieves a positive storage of information in a short time.

Other objects, features and advantages of the present invention will become more apparent from the following detailed description when read in conjunction with the accompanying drawings.

BRIEF DESCRIPTION OF THE DRAWINGS

FIG. 6 is an illustration for explaining a data structure of defect managing areas according to the first embodiment of the present invention;

FIG. 7 is an illustration for explaining a data structure of disk map data according to the first embodiment of the present invention;

FIG. 19 is an illustration for explaining a threshold-value setting table according to the second embodiment of the present invention.

DETAILED DESCRIPTION OF THE PREFERRED EMBODIMENTS

Figure 1:
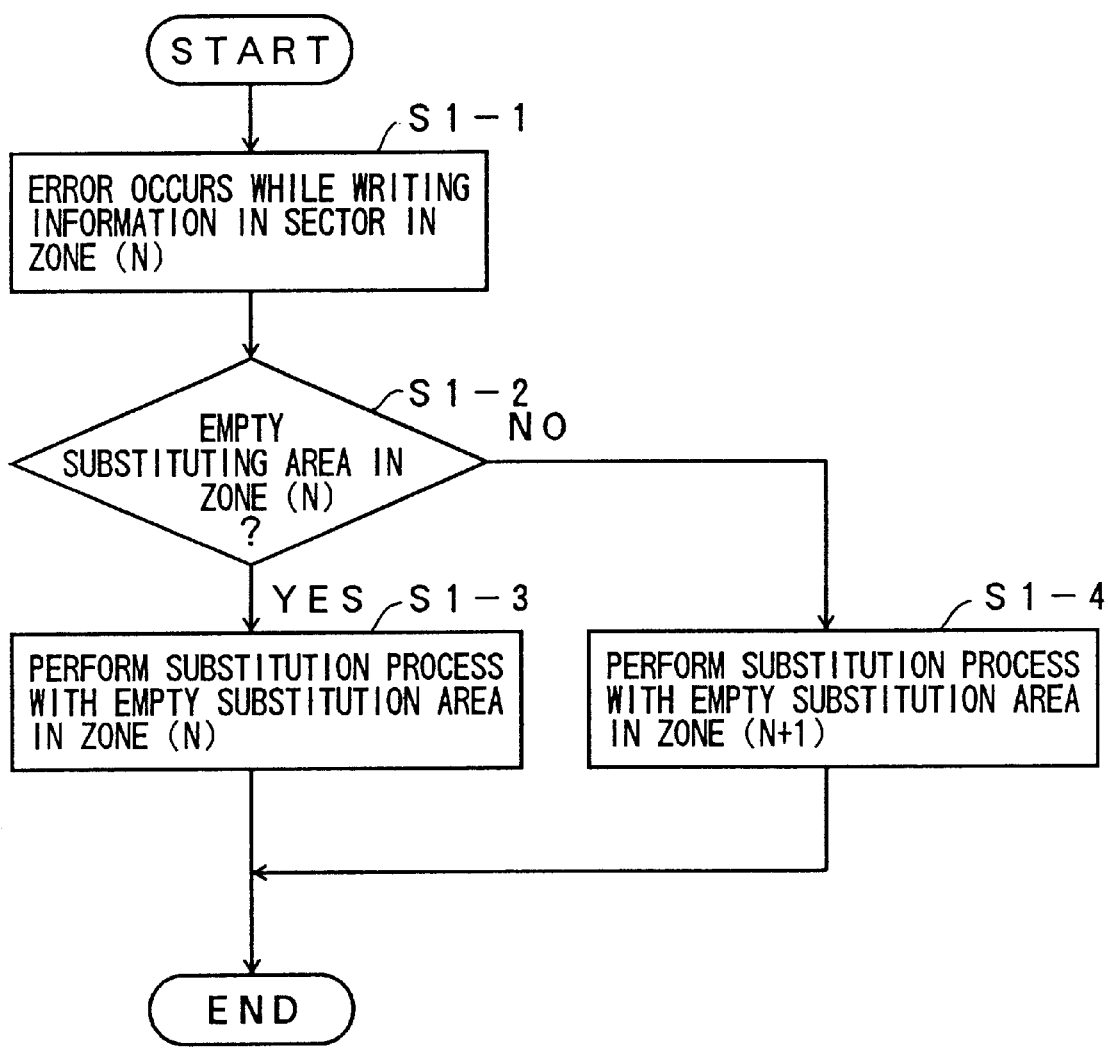
FIG. 1 is a flowchart for explaining a conventional substitution process.
Figure 2:
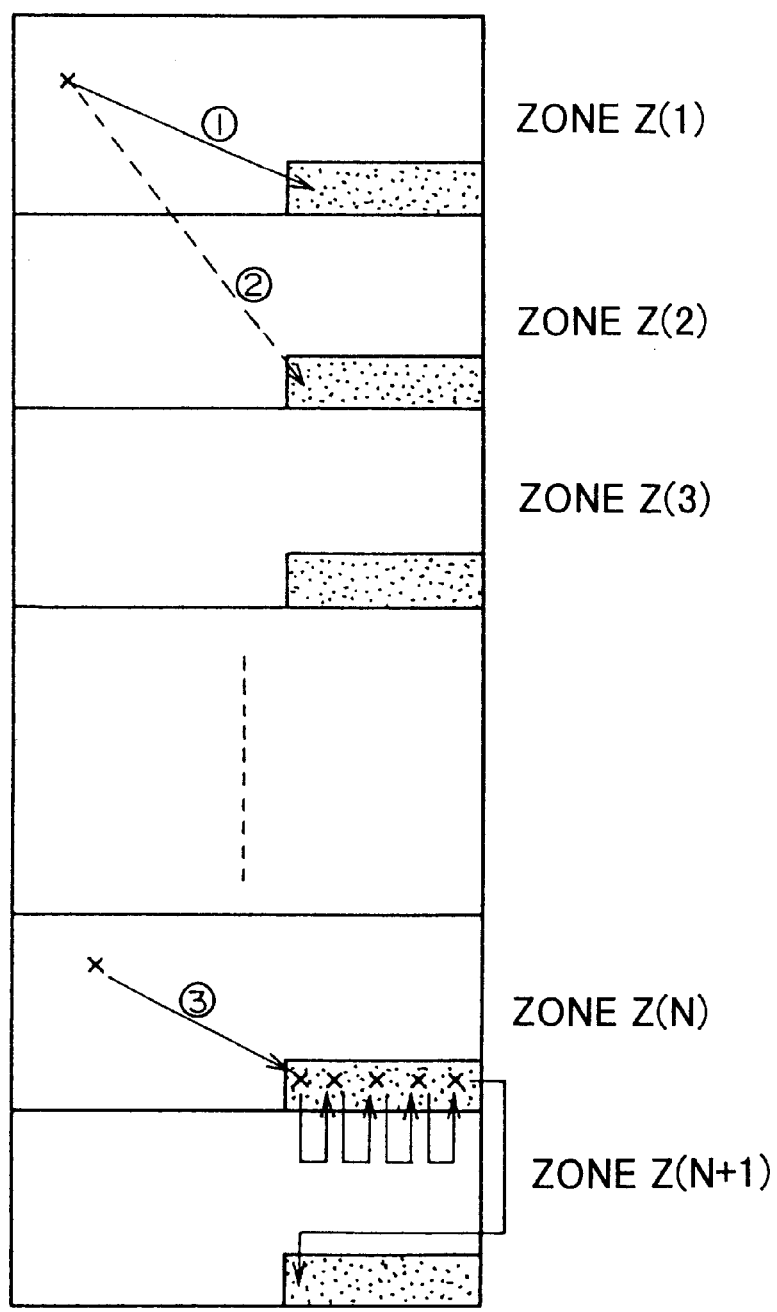
FIG. 2 is an illustration for explaining the conventional substitution process shown in FIG. 1.
Figure 3:
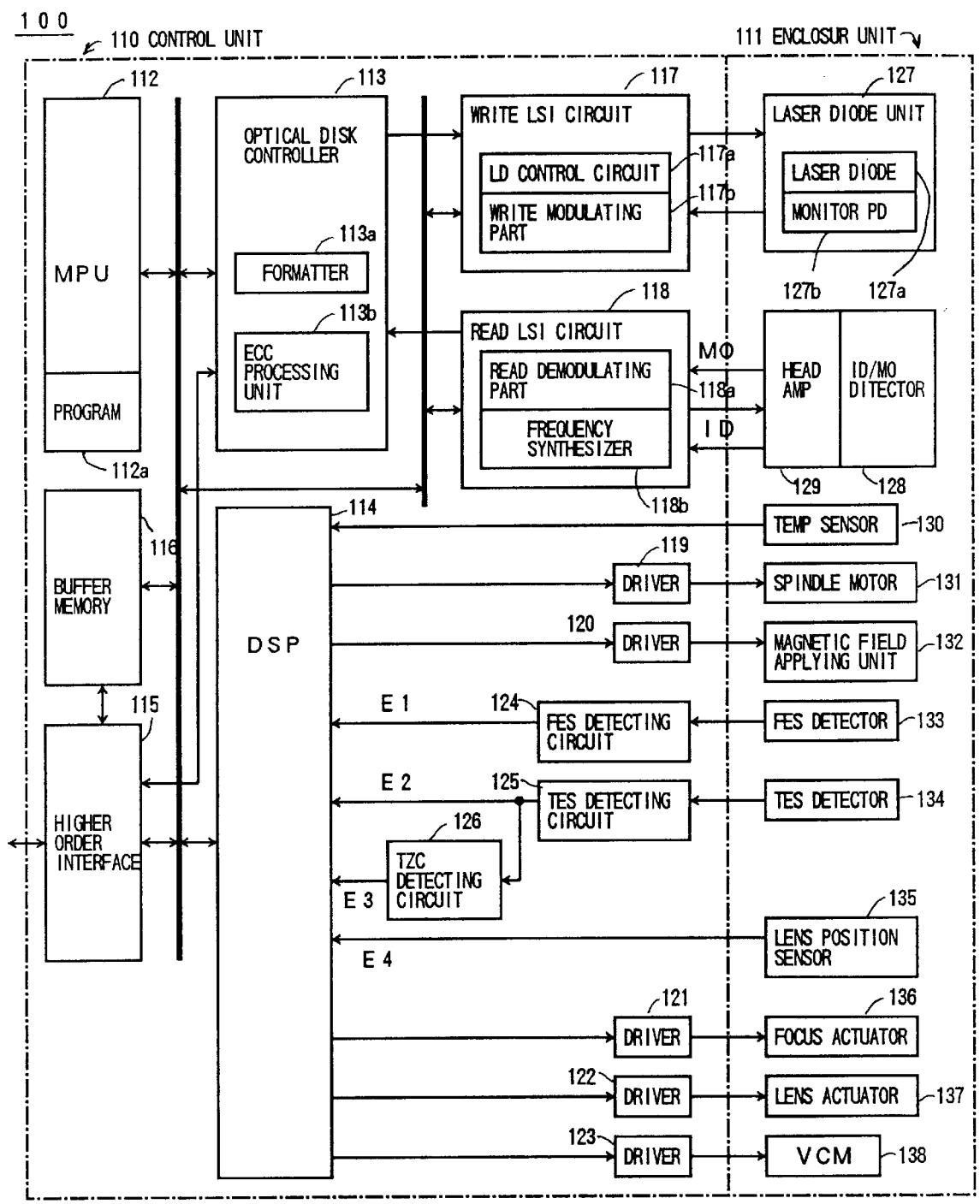
FIG. 3 is a block diagram of a magneto-optical disk apparatus according to a first embodiment of the present invention.

A description will now be given, with reference to FIG. 3, of a first embodiment of the present invention. FIG. 3 is a block diagram of a magneto-optical disk apparatus 100 according to the first embodiment of the present invention.

The magneto-optical disk apparatus 100 according to the present embodiment comprises a control unit 110 and an enclosure unit 111. The control unit 110 is connected to each part of the enclosure unit 111 so as to perform various signal processing operations for recording and reproduction. A recording medium is inserted into the enclosure unit 111 so that information is recorded on the recording medium or information recorded on the recording medium is read for reproduction.

The control unit 110 comprises an MPU 12, an optical disk controller 113, a DSP 114, a higher-order interface 115, a buffer memory 116, a write LSI circuit 117, a read LSI circuit 118, drivers 119 to 123, focus error signal detecting circuit 124, a tracking error signal detecting circuit 125 and a track zero-cross detecting circuit 126. The enclosure unit 111 comprises a laser diode unit 127, an ID/MO detector 128, a head amplifier 129, a temperature sensor 130, a spindle motor 131, a magnetic field applying unit 132, a focus servo detector 133, a tracking servo detector 134, a lens position sensor 135, a focus actuator 136, a lens actuator 137 and a VCM 138.

The MPU 112 includes a program area 112a so as to control an entire apparatus in accordance with programs stored in the program area 112a. The optical disc controller 113 includes a formatter 113a and an error check code (ECC) processing part 113b. The formatter 113a produces a record format by dividing NRZ write data based on a unit of sector of the recording medium when a write access is performed. The ECC processing part 113b produces error check code based on the unit of the sector write data so as to add the error check code to the sector write data. Additionally, the ECC processing part produces a CRC code, if necessary, and add the CRC code to the sector write data. The optical disk controller 114 converts the sector data, which has been ECC encoded, into 1-7RLL code, and supplies the converted code to the write LSI circuit 117.

When a read access is performed, the optical disk controller 113 performs a reverse conversion on sector read data, which is demodulated by the read LSI circuit 118, according to 1-7RLL code. The ECC processing unit 113b performs a CRC check on the sector read data, and, thereafter, performs an error detecting and correcting operation. The formatter 113a connect sets of NRZ data, which is based on a sector unit, so as to form a stream of NRZ read data, and supplies the NRZ read data to the buffer memory 116.

The DSP 114 is connected to each of the MPU 112, the optical disk controller 113 and the buffer memory 116. The DSP 114 is also connected between the higher-order interface 115 and drivers of various sensors. The DSP 114 performs various signal processing operations.

The higher-order interface 115 exchanges data with a higher-order apparatus. The buffer memory 116 temporarily stores write data and read data.

The write LSI circuit 117 includes a write modulating part 117a and an LD control circuit 117b. The write modulating part 117a converts the write data, which is supplied from the optical disk controller 113, into PPM recording data format or PWM recording data format.

The read LSI circuit 118 includes a read demodulating part 118a and a frequency synthesizer 118b. The read demodulating part 118a converts the read data into PPM recording data format or PWM recording data format. The frequency synthesizer 118b generates a clock having a frequency corresponding to a zone of the write data in accordance with an instruction sent from the MPU 112, and supplies the clock to the read demodulating part 118a. The read demodulating part 118a performs a demodulating operation in accordance with the clock supplied by the frequency synthesizer 118b.

The driver 119 generates a drive signal for rotating the recording medium in accordance with drive data supplied from the DSP 114. The driver 119 supplies the drive signal to the spindle motor 131 provided in the enclosure unit 111. The driver 120 generates a drive signal in accordance with magnetic field application data supplied from the DPS 114. The driver 120 supplies the drive signal to the magnetic field applying unit 132 provided in the enclosure unit 111. The driver 121 generates a focus drive signal in accordance with focus drive data supplied from the DSP 114. The driver 121 supplies the focus drive signal to the focus actuator 136 provided in the enclosure unit 111. The driver 122 generates driver lens drive signal in accordance with lens drive data supplied from the DSP 114. The driver 122 supplies the lens drive signal to the lens actuator 137 provided in the enclosure unit 111. The driver 123 generates a VCM drive signal in accordance with VCM drive signal supplied from the DSP 114. The driver 123 supplies the VCM drive signal to the VCM 138 provided in the enclosure unit 111.

A focus error signal (FES) detecting circuit 124 is connected to an FES detector 132 provided in the enclosure unit 111 so as to supply a focus error signal detected by the FES detector 133 to the DSP 114. A tracking error signal (TES) detecting circuit 125 is connected to a TES detector 134 provided in the enclosure unit 111 so as to supply a tracking error signal detected by the TES detector 134 to the DSP 114 and a tracking zero-cross (TZC) detecting circuit 126. The TZC detecting circuit 126 detects a zero-cross signal in accordance with a detection signal output from the TES detecting circuit 125, and supplies the zero-cross signal to the DSP 114.

As mentioned above, the enclosure unit 111 comprises the laser diode unit 127, the ID/MO detector 128, the head amplifier 129, the temperature sensor 130, the spindle motor 131, the magnetic field applying unit 132, the focus servo detector 133, the tracking servo detector 134, the lens position sensor 135, the focus actuator 136, the lens actuator 137 and the VCM 138.

The laser diode unit 127 includes a laser diode 127a and a monitor photodetector (PD) 127b. The laser diode 127a projects a laser beam onto the recording medium. The laser beam corresponds to the write data supplied from the write LSI circuit 117. The monitor PD 127b detects an intensity of the laser beam emitted by the laser diode 127a, and supplies information regarding the detected intensity of the laser beam to the write LSI circuit 117. The writer LSI circuit 117 controls the write signal in accordance with the intensity detected by the monitor PD 127b.

The ID/MO detector 128 detects the laser beam reflected by the recording medium, and generate an ID/MO detection signal. The ID/MO signal generated by the ID/MO detector 128 is supplied to the head amplifier 129. The head amplifier 129 amplifies the ID/MO detection signal detected by the ID/MO detector 128, and supplies the amplified signal to the read LSI circuit 118.

The temperature sensor 130 detects a temperature around the recording medium, and supplies information regarding the detected temperature to the DSP 114. The spindle motor 131 engages a center hole of the recording medium so as to rotate the recording medium. The magnetic field applying unit 132 applies a bias magnetic field for recording.

The FES detector 133 detects a focus error signal of the laser beam emitted by the laser diode 127a and reflected by the recording medium. The FES detector 133 supplies the focus error signal to the FES detecting circuit 124 provided in the control unit 110. The TES detector 134 detects a tracking error signal of the laser beam emitted by the laser diode 127a and reflected by the recording medium. The TES detector 134 supplies the tracking error signal to the TES detecting circuit 125 provided in the control unit 110.

The lens position sensor 135 detects a position of a focus lens for the laser beam projected onto the recording medium so as to generate a lens position signal to be supplied to the DSP 114. The focus actuator 136 controls the position of the focus lens in accordance with the focus drive signal supplied from the driver 121 so that the laser beam emitted by the laser diode 127a scans along a desired track on the recording medium.

The VCM 138 moves a pickup unit (not shown in the figure) including the laser diode unit 127 in a radial direction of the recording medium so that a position at which the laser beam is focused and the magnetic field is applied is moved in a radial direction of the recording medium.

Figure 4:
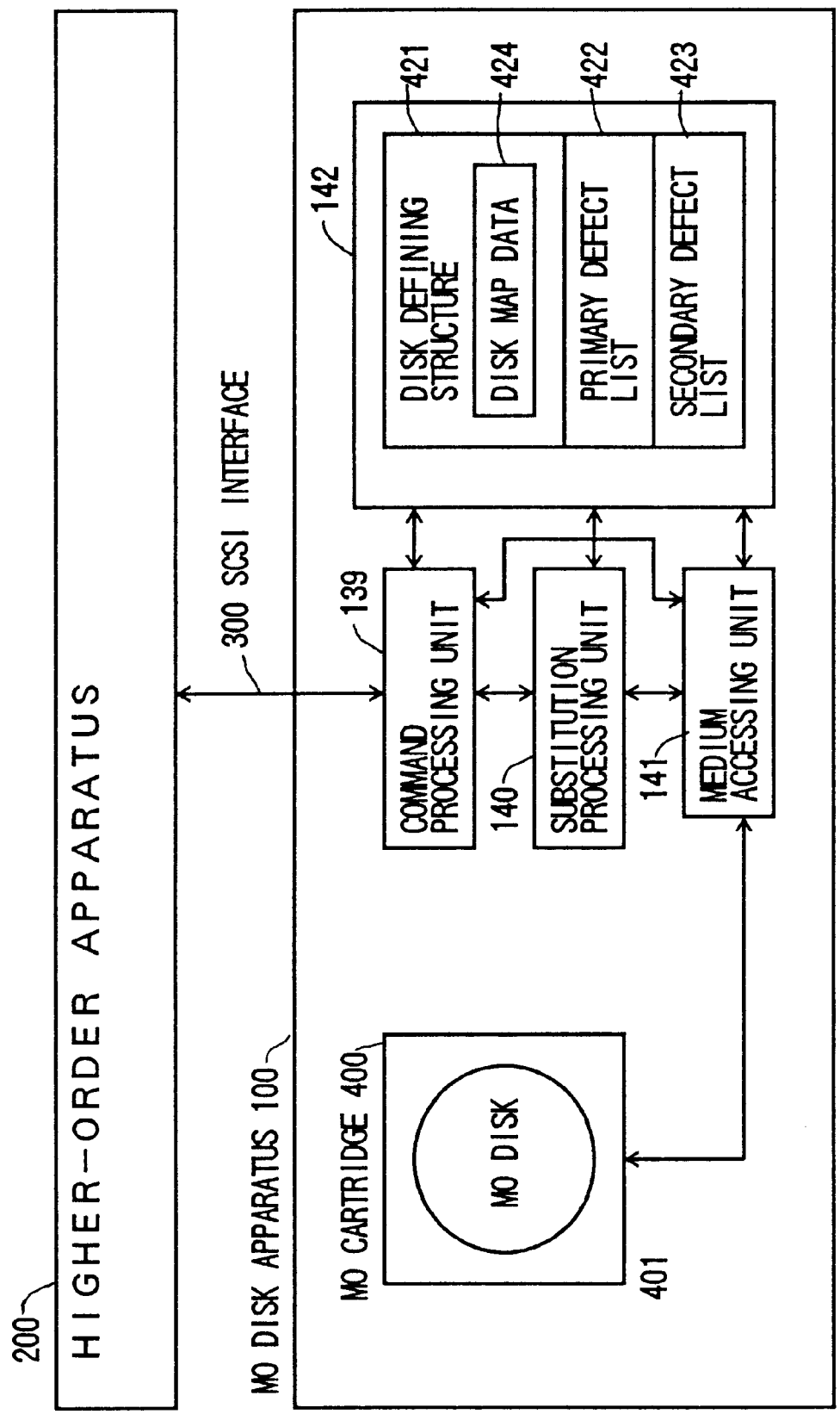
FIG. 4 is a functional block diagram of the magneto-optical disk apparatus shown in FIG. 3.

FIG. 4 is a functional block diagram of the magneto-optical disk apparatus 100 shown in FIG. 3.

As shown in FIG. 4, the magneto-optical disk apparatus 100 is connected to a higher-order apparatus 200 via a SCSI interface 300.

The magneto-optical drive apparatus 100 comprises a command processing unit 139, a substitution processing unit 140, a medium accessing unit 141 and a disk managing unit 142. The above-mentioned functional units operate in accordance with the programs stored in the program area 112a of the MPU 112.

Figure 13:
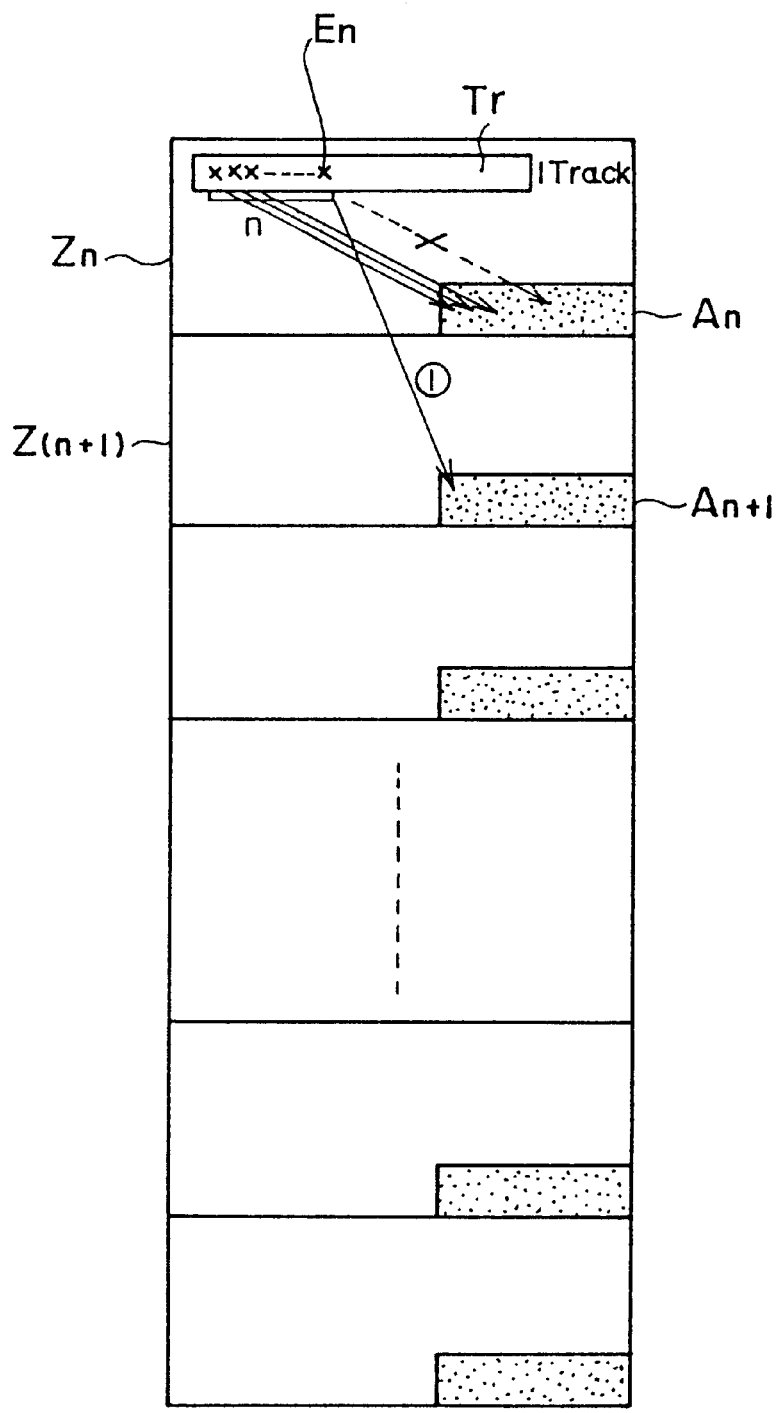
FIG. 13 is an illustration for explaining a third substitution process performed by the substitution processing unit shown in FIG. 4.

The command processing unit 139 is achieved by the higher-order interface 115 and the optical disc controller 113 shown in FIG. 13. The substitution processing unit 140 is achieved by the optical disk controller 113 and other circuits. The medium accessing unit 141 is achieved by each circuit in the control unit 110 and the enclosure unit 111.

The disk managing unit 142 is achieved by the MPU 112 and programs stored in the program area 112a. The command processing unit 139 receives a command from the higher-order apparatus 200 via the SCSI interface 300. The command processing unit 139 controls the medium accessing unit 141 in accordance with the received command. The medium accessing unit 141 performs an operation for accessing a magneto-optical disk (recording medium) 401 accommodated in a disk cartridge 400 inserted into the magneto-optical disk apparatus 100 under the control of the command processing unit 139.

The substitution processing unit 140 is provided with the command from the command processing unit 139 so as to perform a accessing process in accordance with defect managing information managed by the disk managing unit 142 when a defective sector is detected. The disk managing information is produced from managing information recorded on the magneto-optical disc 401.

Figure 5:
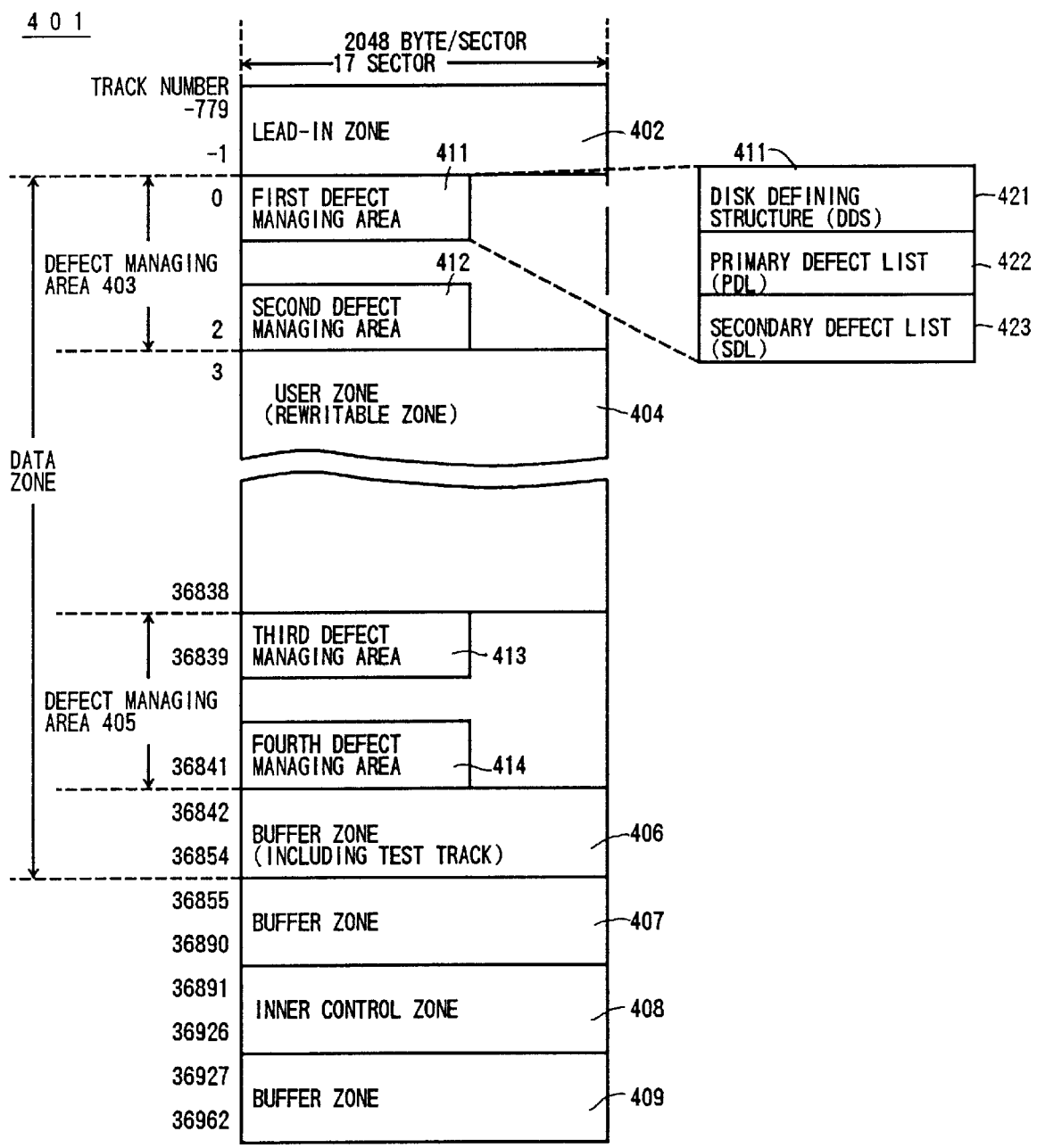
FIG. 5 is an illustration for showing the structure of data recorded on a magneto-optical disk.

A description will now be given, with reference to FIG. 5, of a structure of data recorded on the magneto-optical disk 401. FIG. 5 is an illustration for showing the structure of data recorded on the magneto-optical disk 401. In FIG. 5, a disk layout is indicated by a logical track number of the magneto-optical disk 401. A single logical track comprises 17 sectors each of which comprises 248 bytes.

The magneto-optical disk 401 is recorded according to the zone CAV method. There are provided on the magneto-optical disk 401 an outermost area, a lead-in zone 402, a defect managing area 403, a user zone 404, a defect managing area 405, a buffer zone 406 including a test track, a buffer zone 407, an inner control zone 408 and a buffer zone 409, in that order from the outermost area toward an innermost area. Among the above-mentioned areas, the areas from the defect managing 403 to the buffer zone 406 constitute a data zone, and other areas constitute a system zone.

The defect managing area 403 located on an outer side of the user zone 404 is provided with a first defect managing area (DMA1) 411 and a second defect managing area (DMA2) 412. The defect managing area 405 located on an inner side of the user zone 404 is provided with a third defect managing area (DMA3) 413 and a fourth defect managing area (DMA4) 414. A predetermined position is set for each of a start position and an end position of each of the first defect managing area 411, the second defect managing area 412, the third defect managing area 413 and the fourth defect managing area 414.

FIG. 6 is an illustration for explaining a data structure of the defect managing areas according to the present embodiment. As shown in FIG. 6, the start position of each of the first to fourth defect managing areas 411 to 414 is determined by a track number and a sector number, and the end position of each of the first to fourth defect managing areas 411 to 414 is also determined by a track number and a sector number. Additionally, the same contents are recorded in each of the first to fourth defect managing areas 411 to 414.

Returning to FIG. 5, the first defect managing area 411 includes, a disk defining structure (DDS) 421, a primary defect list (PDL) 422 and a secondary defect list (SDL) 423. Each of the second, third and fourth defect managing areas 412, 413 and 414 has the same contents of the same structure as the first defect managing area 411.

The disk defining structure 421 stores a start address of each of the primary defect list 422 and the secondary defect list 423. The disk defining structure 421 also stores disk map data (DMD) 424. The disk maps data 424 is related to a data area and a spare area in each zone included in the user zone 404.

FIG. 7 is an illustration for explaining a data structure of the disk map data according to the present embodiment. As shown in FIG. 7, the disk map data includes a number of data sectors, a number of spar sectors and a number of spare logical tracks for each zone. The user zone 404 is a rewritable zone which can be accessed by the higher-order apparatus through the SCSI interface.

Figure 8:
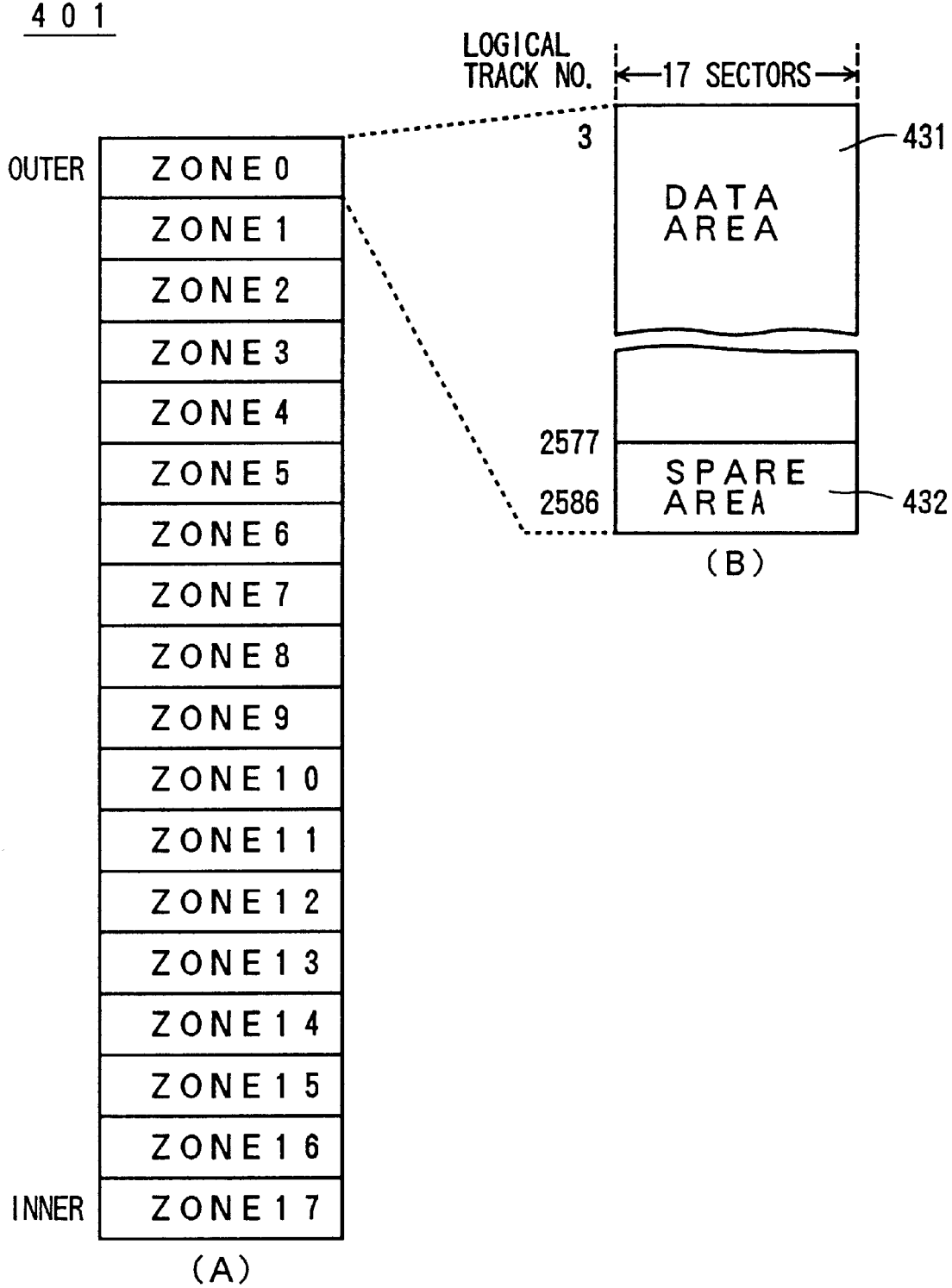
FIG. 8 is an illustration for explaining a data structure of a user zone.

FIG. 8 is an illustration for explaining a data structure of the user zone 404.

The user zone 404 is divided into 18 zones. Each of the zones is numbered as 0, 1, 2, . . . and 17 from outer side. Each of the zones includes a data area 431 and a spare area 432. A clock frequency is set smaller as it goes closer to the innermost zone so that a substantially constant linear velocity can be obtained by the zone CAV method.

Figure 9:
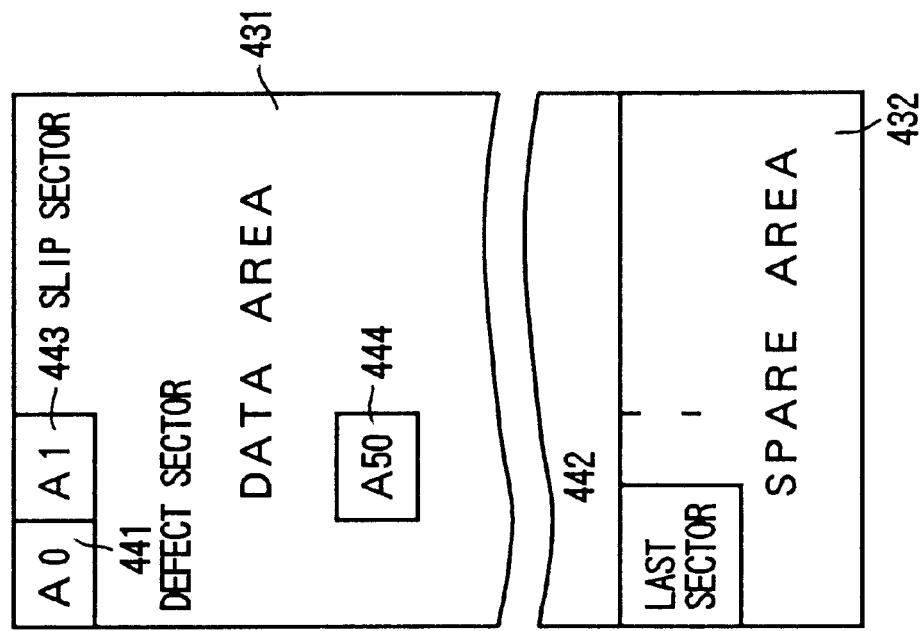
FIG. 9A is an illustration of a state of a data area shown in FIG. 8 and a state of a spare area shown in FIG. 8.
FIG. 9B is an illustration of contents of a primary defect list.
FIG. 9C is an illustration of contents of a secondary defect list.

FIG. 9A is an illustration of a state of the data area 431 and a state of the spare area 432 of one of the zones. FIG. 9B is an illustration of contents of the primary defect list 422. FIG. 9C is an illustration of contents of the secondary defect list 423.

It is assumed that a defect occurs when a formatting process is performed for formatting the first sector 441 having an address A0 as shown in FIG. 9A and the sector 441 is detected as a defective sector. If the sector 441 of the address A0 is detected as a defective sector, the address A0 of the defective sector is registered in the primary defect list 422 as shown in FIG. 9B. When the address A0 of the defective sector is registered in the primary defect list 422, the end sector 442 of the data area 431 is shifted to the spare area 432 by the defective sector 411 as shown in FIG. 9A. After the formatting process for the sector is completed, the defective addresses A0, A10 and Ai are registered in the primary defect list 422 as shown in FIG. 9B.

If the first sector 441 of the data area 431 is accessed by a read/write command after formatting, the primary defect list 422 is referred to by the access address A0. By referring to the primary defect list 422, it can be appreciated that the address A0 is registered as a defective address. Thus, it can be determined that the sector 441 being accessed is determined as a defective sector.

Accordingly, an operation proceeds to check the next address A1 of the sector 443 which is a slip sector. Thereafter, it is determined whether or not the slip sector 443 is a defective sector by referring to the primary defect list 422. As a result, if the slip sector 433 is a defective sector, the operation proceeds to check a next sector, and performs the same defect sector determining operation.

A description will now be given of a method for producing the secondary defect list 423.

It is assumed that a sector 444 corresponding to the sector address A50 in the data area 431 is accessed according to a write command, and the sector 444 is a defective address. When a defect is detected in the sector 444 corresponding to the sector address A50, the defective address A50 and a substitution address An corresponding to a substitutional area processed by the substitution processing unit 140 in combination are registered in the last empty sector in the secondary defect list 423 as shown in FIG. 9C.

When the defective address A50 registered in the secondary defect list 423 is accessed according to a read/write command, the primary defect list is referred to first. If a primary defect is not found by referring to the primary defect list 422, the secondary defect list 423 is referred to subsequently. When the secondary defect list 423 is referred to, the substitution address An, which is an address of the spare area 432 registered as making a pair with the address A50 registered as a defect address.

It should be noted that the contents of the above-mentioned disk defining structure 421, the primary defect list 422 and the secondary defect list 423 are read from the magneto-optical disk 401 when the disk cartridge 400 is attached to the magneto-optical disk apparatus 100, and are stored in a memory in the MPU 112.

Additionally, when the disk cartridge 400 is ejected from the magneto-optical disk apparatus 100, the updated primary defect list 422 and secondary defect list 423 are overwritten on the magneto-optical disk 401.

It should be noted that although the data structure shown in FIGS. 5 to 9 are related to a magneto-optical disk having a capacity of 1.3 GB, other disks having a capacity such as 128 MB, 230 MB, 540 MB or 640 MB also has a similar format, and descriptions thereof will be omitted.

The substitution processing unit 140 determines a possibility of occurrence of a defect in a zone accessed according to the primary defect list 422 and the secondary defect list 423 so as to control the substitution process.

Figure 10:
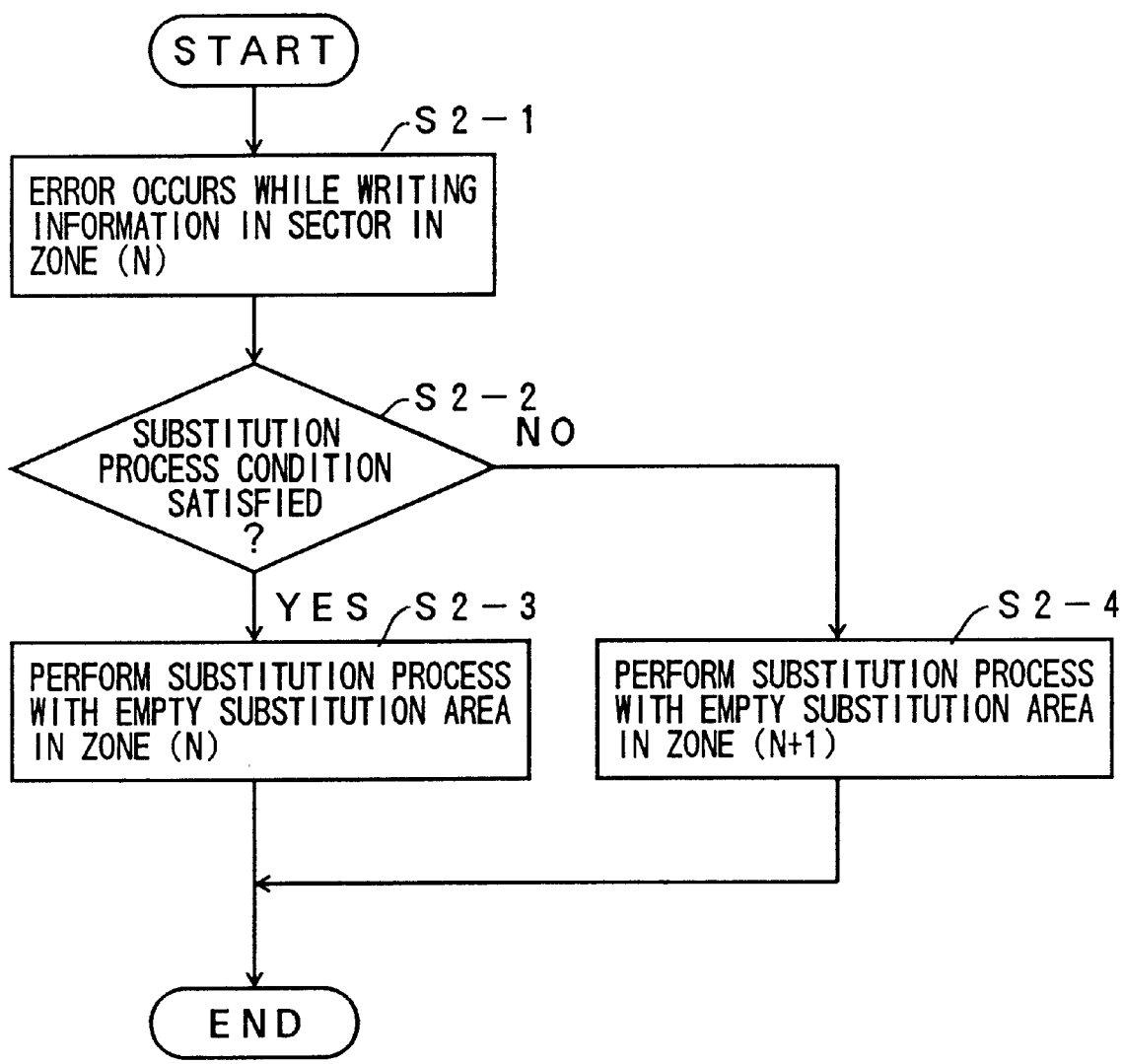
FIG. 10 is a flowchart of a substitution process performed by a substitution processing unit according to the first embodiment of the present invention.

FIG. 10 is a flowchart of the substitution process performed by the substitution processing unit 140 according to the present embodiment.

In step S2-1, an error En occurs in a sector within a zone Z(N) while information is written in the zone Z(N). The substitution processing unit 140 determines, in step S2-2, whether or not a substitution processing condition to a zone Z(N) is satisfied in accordance with information stored in the defect managing unit 142. If it is determined, in step S2-2, that the substitution processing condition is satisfied, the routine proceeds to step S2-3. In step S2-3, the information is written in a substitutional area An in the zone Z(N). On the other hand, if it is determined, in step S2-4, that the substitution processing condition is not satisfied, the routine proceeds to step S2-4. In step S2-4, the information is written in a substitutional area An+1 in the next zone Z(N+1).

Figure 11:
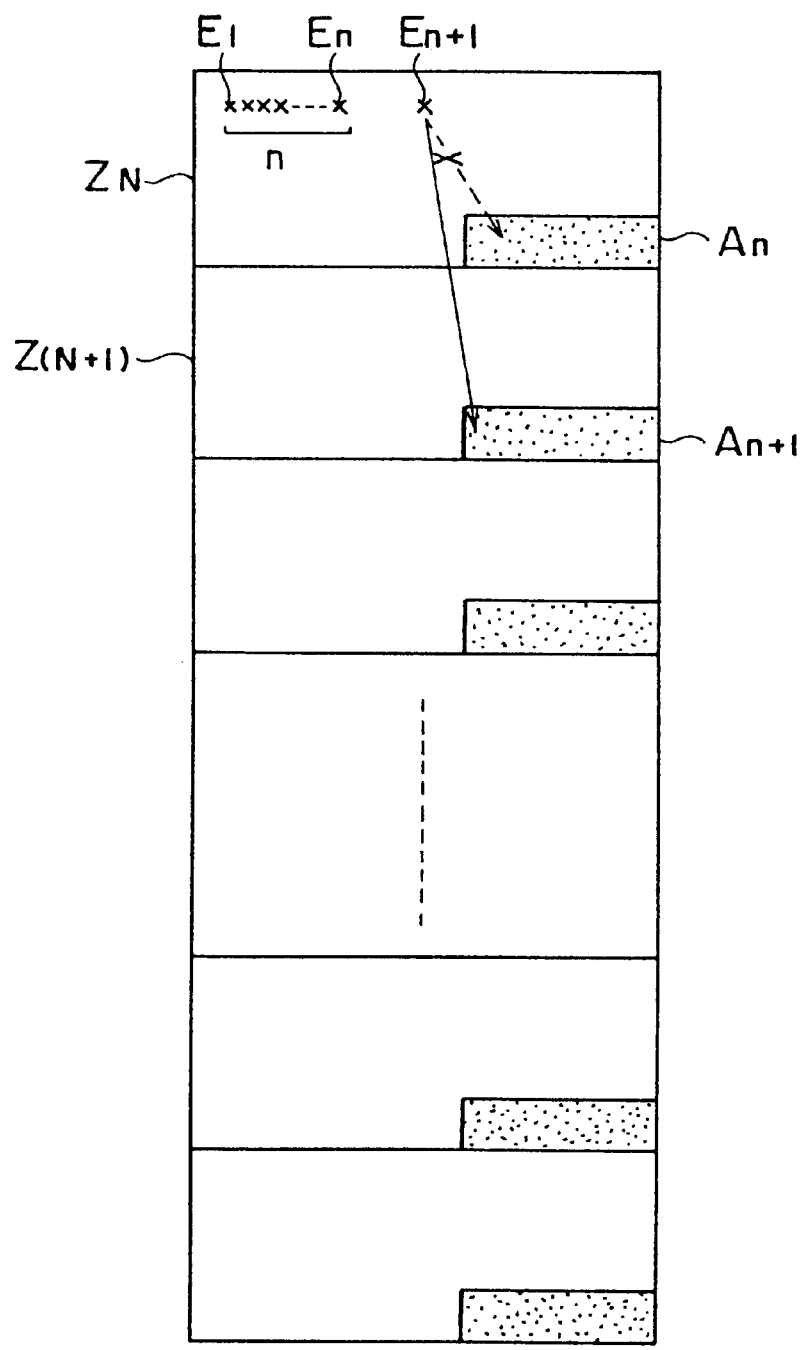
FIG. 11 is an illustration for explaining a first substitution process performed by the substitution processing unit shown in FIG. 4.

A description will now be given of the substitution processing condition used in the above-mentioned step S2-2. First, a description will be given, with reference to FIG. 11, of a first substitution process performed by the substitution processing unit 140 in accordance with a first substitution processing condition. The first substitution processing condition is a condition in which a number of errors which have occurred in the zone Z(N) is equal to or smaller than a predetermined number n. FIG. 11 is an illustration for explaining the first substitution process performed by the substitution processing unit 140 according to the present embodiment.

The substitution processing unit 140 determines whether or not a number of errors which have occurred in the zone Z(N) is equal to or smaller than the predetermined number n, which condition is the first substitution processing condition, in accordance with the contents of the secondary defect list 423. If the number of errors in the zone Z(N) is greater than n, that is, if the (n+1)th error En+1 occurs in the zone Z(N), the information to be recorded in the sector in which the error En+1 occurs is recorded in a substitutional area An+1 of the next zone Z(N+1). It should be noted that the number n is smaller than the number of all sectors in the substitutional area.

The number of errors which have occurred in the zone Z(N) is obtained by counting the number of defective addresses included in the zone Z(N) among defective addresses registered in the secondary defect list 423.

That is, when the (n+1)th error occurs in the zone Z(N), the zone Z(N) is regarded as a zone in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

Figure 12:
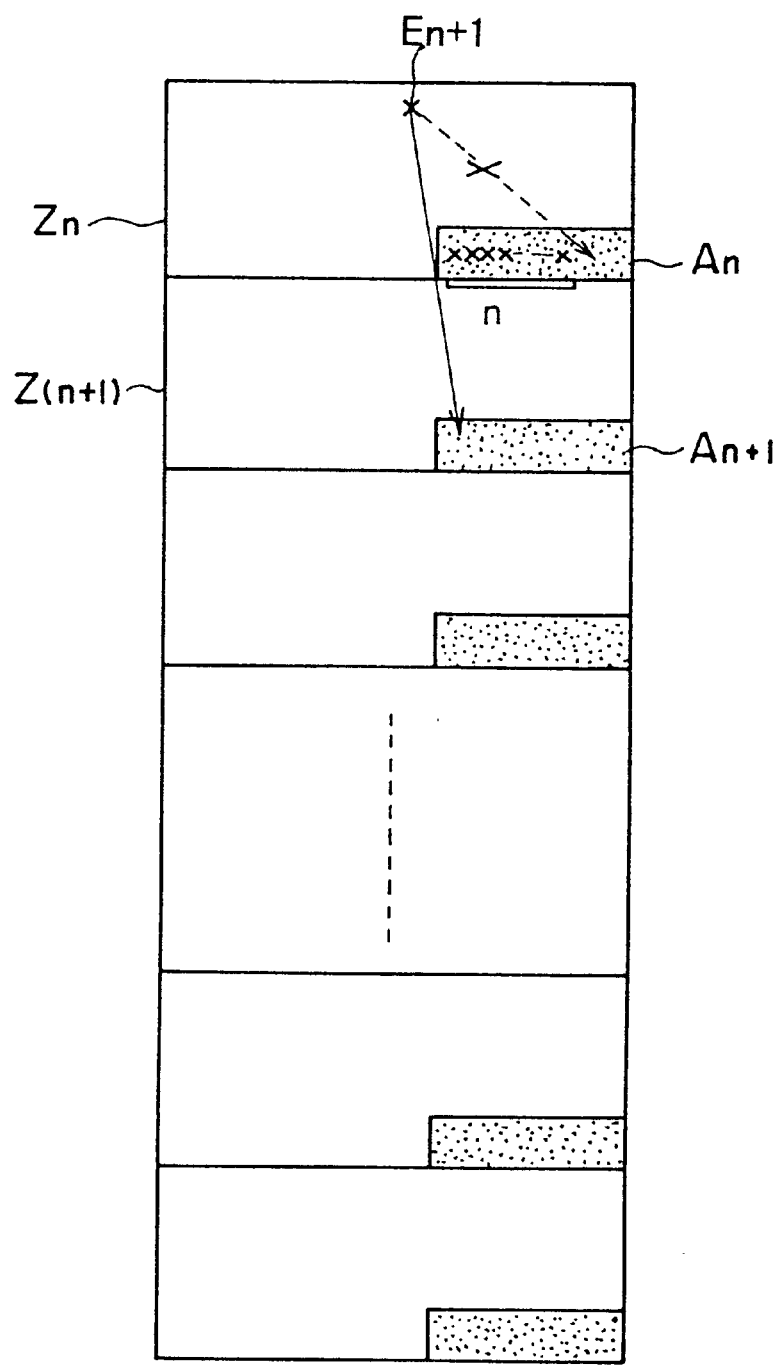
FIG. 12 is an illustration for explaining a second substitution process performed by the substitution processing unit shown in FIG. 4.

A description will now be given, with reference to FIG. 12, of a second substitution process performed by the substitution processing unit 140 in accordance with a second substitution processing condition. The second substitution processing condition is a condition in which a number of errors which have occurred in the substitutional area An of the zone Z(N) is smaller than a predetermined number n. FIG. 12 is an illustration for explaining the second substitution process performed by the substitution processing unit 140 according to the present embodiment.

When the (n+1)th error En+1 occurs in the zone Z(N), the substitution processing unit 140 determines whether or not a number of errors which have occurred in the substitution are An of the zone Z(N) is smaller than the predetermined number n, which condition is the second substitution processing condition, in accordance with the contents of the secondary defect list 423. If the number of errors in the substitutional area An of the zone Z(N) is equal to or greater than n, the information to be recorded in the sector in which the error En+1 occurs is recorded in a substitutional area An+1 of the next zone Z(N+1). It should be noted that the number n is smaller than the number of all sectors in the substitutional area.

The number of errors which have occurred in the substitutional area An of the zone Z(N) is obtained by counting the number of defective addresses included in the substitutional area An of the zone Z(N) among defective addresses registered in the secondary defect list 423.

That is, when the (n+1)th error occurs in the substitutional area An of the zone Z(N), the zone Z(N) is regarded as a zone in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

A description will now be given, with reference to FIG. 13, of a third substitution process performed by the substitution processing unit 140 in accordance with a third substitution processing condition. The third substitution processing condition is a condition in which a number of errors which have occurred in a single track Tr of the zone Z(N) is smaller than a predetermined number n. FIG. 13 is an illustration for explaining the third substitution process performed by the substitution processing unit 140 according to the present embodiment.

When the n-th error En occurs in the zone Z(N), the substitution processing unit 140 determines whether or not a number of errors which have occurred in the single track Tr of the zone Z(N) is smaller than the predetermined number n, which condition is the third substitution processing condition, in accordance with the contents of the secondary defect list 423. If the number of errors in the track Tr of the zone Z(N) is equal to or greater than n, the information to be recorded in the sector in which the error En occurs is recorded in a substitutional area An+1 of the next zone Z(N+1). It should be noted that the number n is smaller than the number of all sectors in the substitutional area.

The number of errors which have occurred in the single track Tr of the zone Z(N) is obtained by counting the number of defective addresses included in the single track Tr of the zone Z(N) among defective addresses registered in the secondary defect list 423.

That is, when the n-th error En occurs in the single track Tr of the zone Z(N), the zone Z(N) is regarded as a zone in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

Figure 14:
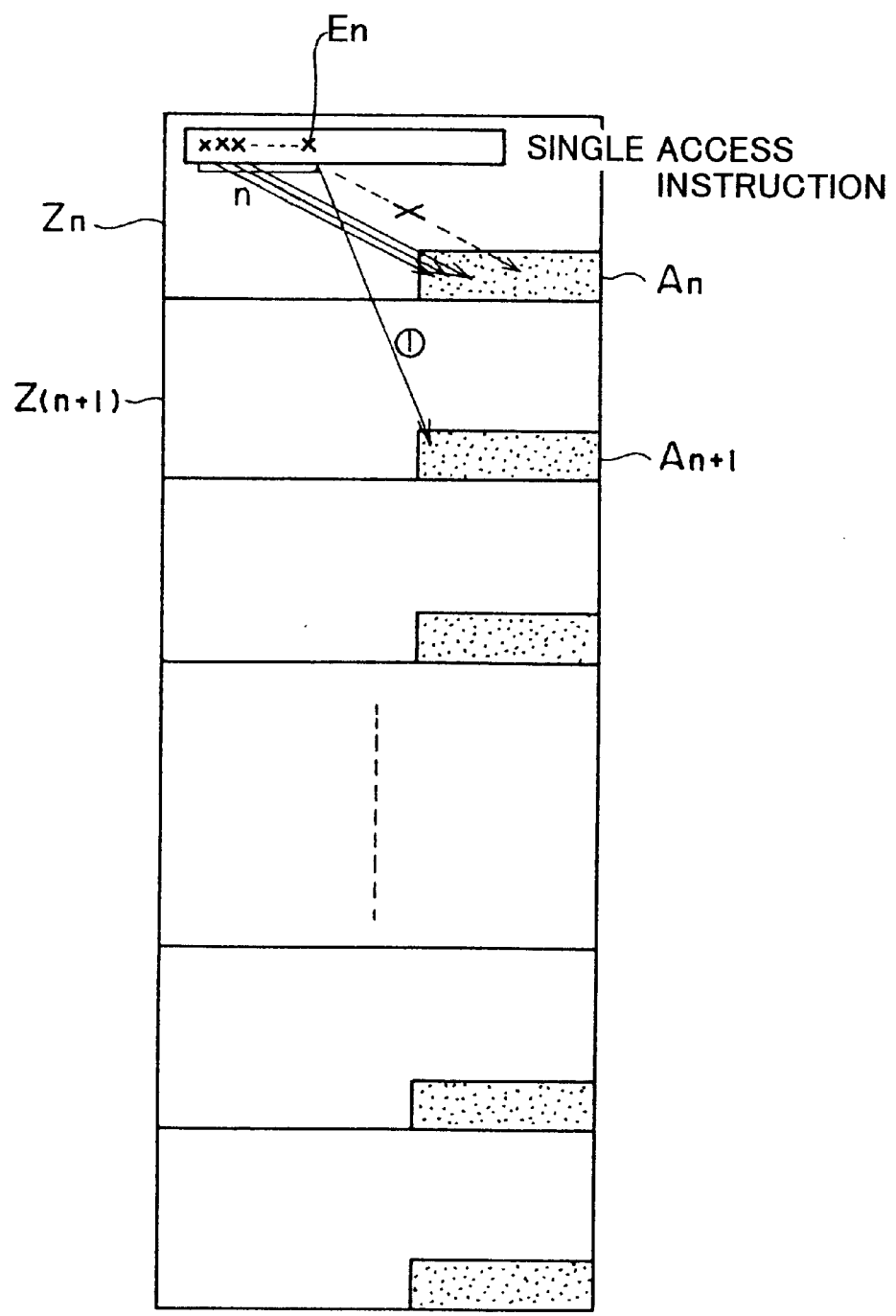
FIG. 14 is an illustration for explaining a fourth substitution process performed by the substitution processing unit shown in FIG. 4.

A description will now be given, with reference to FIG. 14, of a fourth substitution process performed by the substitution processing unit 140 in accordance with a fourth substitution processing condition. The fourth substitution processing condition is a condition in which a number of errors which have occurred during a single access to the zone Z(N) is smaller than a predetermined number n. FIG. 14 is an illustration for explaining the fourth substitution process performed by the substitution processing unit 140 according to the present embodiment.

When the n-th error En occurs in the zone Z(N), the substitution processing unit 140 determines whether or not a number of errors which have occurred during a single access to the zone Z(N) is smaller than the predetermined number n, which condition is the fourth substitution processing condition, in accordance with the contents of the secondary defect list 423. If the number of errors during a single access to the zone Z(N) is equal to or greater than n, the information to be recorded in the sector in which the error En occurs is recorded in a substitutional area An+1 of the next zone Z(N+1). It should be noted that the number n is smaller than the number of all sectors in the substitutional area.

The number of errors which have occurred during a single access to the zone Z(N) is obtained by counting the number of defective addresses consecutively registered for the substitutional area An of the zone Z(N) among defective addresses registered in the secondary defect list 423.

That is, when the n-th error En occurs during a single access to the zone Z(N), the zone Z(N) is regarded as a zone in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

Figure 15:
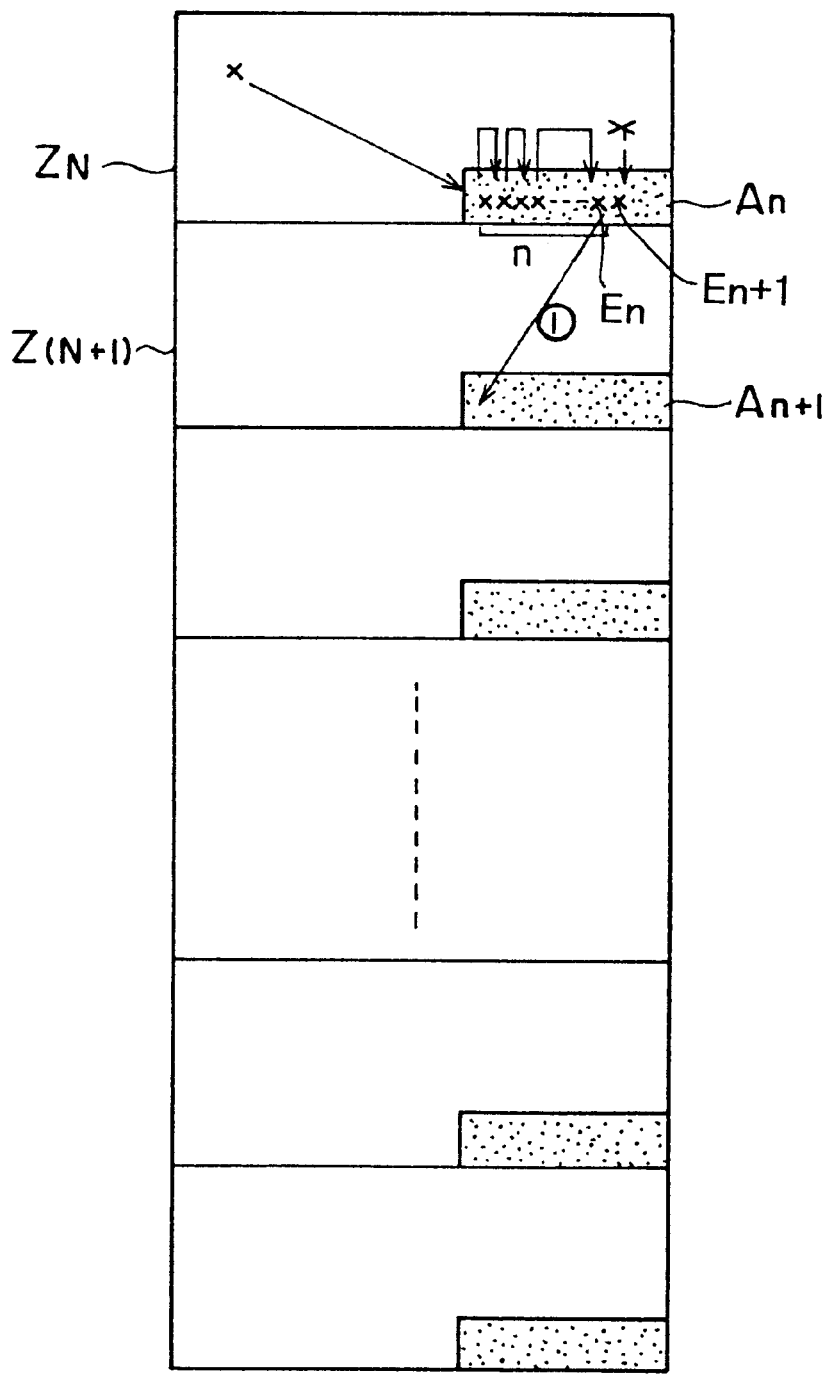
FIG. 15 is an illustration for explaining a fifth substitution process performed by the substitution processing unit shown in FIG. 4.

A description will now be given, with reference to FIG. 15, of a fifth substitution process performed by the substitution processing unit 140 in accordance with a fifth substitution processing condition. The fifth substitution processing condition is a condition in which a number of errors which have occurred consecutively in the substitutional area An of the zone Z(N) is equal to or smaller than a predetermined number n. FIG. 15 is an illustration for explaining the fifth substitution process performed by the substitution processing unit 140 according to the present embodiment.

When the (n+1)th error En+1 occurs in the substitutional area An of the zone Z(N), the substitution processing unit 140 determines whether or not a number of errors which have occurred consecutively in the substitutional area of the zone Z(N) is equal to or smaller than the predetermined number n, which condition is the fifth substitution processing condition, in accordance with the contents of the secondary defect list 423. If the number of errors consecutively occurs in the substitutional area An of the zone Z(N) is greater than n, the information to be recorded in the sector in which the error En+1 occurs is recorded in a substitutional area An+1 of the next zone Z(N+1). It should be noted that the number n is smaller than the number of all sectors in the substitutional area.

The number of errors which have occurred consecutively in the substitutional area of the zone Z(N) is obtained by counting the number of defective addresses consecutively registered for the substituting area An of the zone Z(N) among defective addresses registered in the secondary defect list 423.

That is, when the (n+1)th error En+1 consecutively occurs in the substitutional area An of the zone Z(N), the zone Z(N) is regarded as a zone in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

Figure 16:
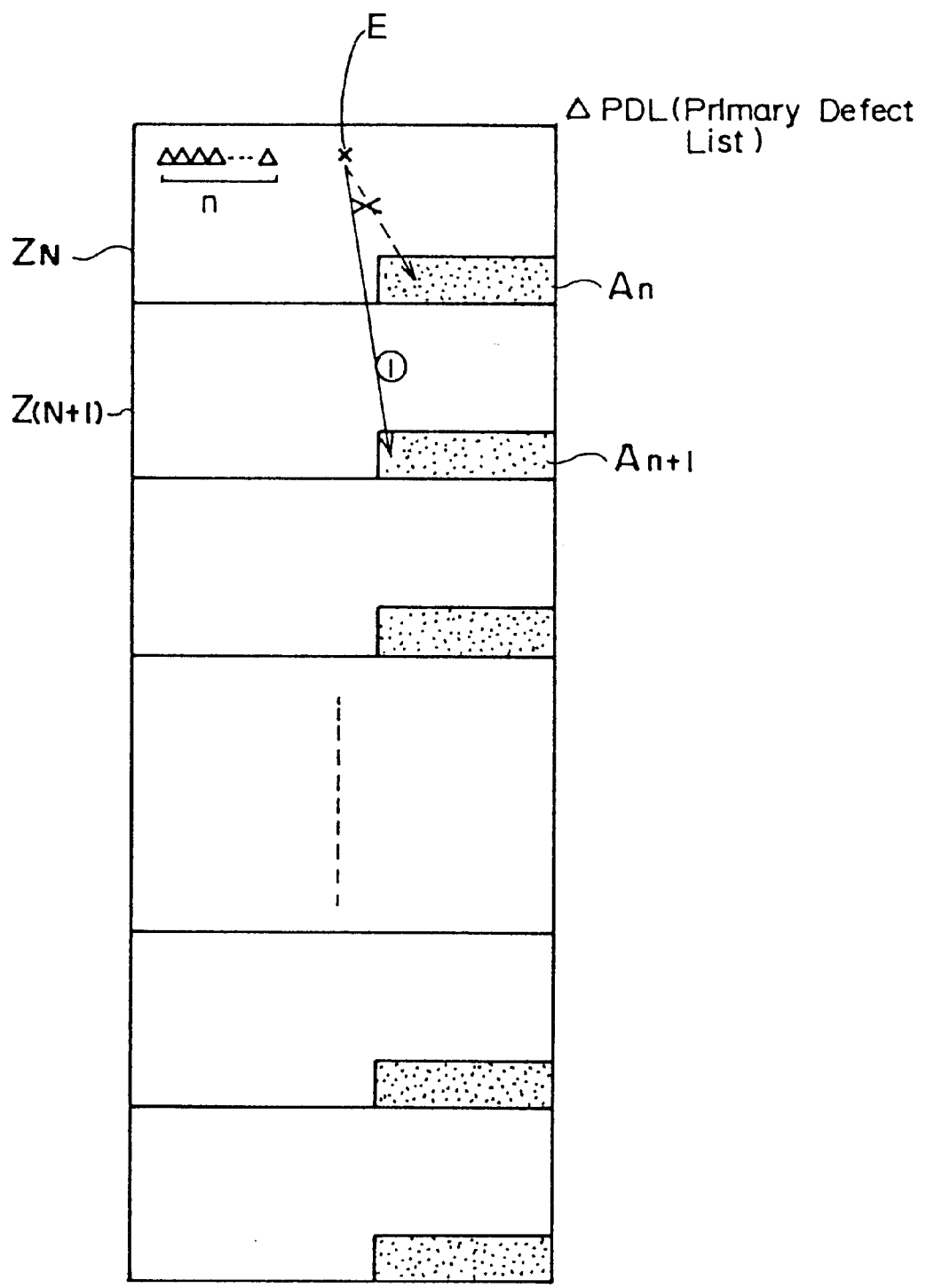
FIG. 16 is an illustration for explaining a sixth substitution process performed by the substitution processing unit shown in FIG. 4.

A description will now be given, with reference to FIG. 16, of a sixth substitution process performed by the substitution processing unit 140 in accordance with a sixth substitution processing condition. The sixth substitution processing condition is a condition in which a number of defective sectors which are registered in the primary defect list is equal to or smaller than a predetermined number n. FIG. 16 is an illustration for explaining the sixth substitution process performed by the substitution processing unit 140 according to the present embodiment.

When an error E occurs in the zone Z(N) and the substitution process is performed, the substitution processing unit 140 obtains a number of primary defective sectors in the zone Z(N). The substitution processing unit 140 then determines whether or not the number of primary defective sectors is equal to or smaller than the predetermined number n, which is the sixth substitution process condition.

If the number of primary defective sectors in the zone Z(N) is equal to or greater than (n+1), the substitution processing unit 140 records the information, which is originally directed to the sector in which the error E occurs, in a substitutional area An+1 o the next zone Z(N+1). It should be noted that the number n is smaller than the number of all sectors in the substitutional area.

The number of primary defective sectors in the zone Z(N) is obtained by counting the number of addresses included in the address or the zone Z(N) in the primary defect list 422.

That is, when an error occurs in the zone Z(N), the primary defect list 422 is referred to. If the number of primary defective sectors is equal to or greater than (n+1), it is determined that the substitutional area An is regarded as an area in which an error frequently occurs. Accordingly, the information originally directed to the substitutional area An of the zone Z(N) is redirected to the substitutional area An+1 of the next zone Z(N+1). That is, if the information is recorded in the substitutional area An of the zone Z(N) which has a high-possibility of occurrence of errors, another error may occur in the substitutional area An of the zone Z(N). Thus, the substitutional areas in the same zone Z(N) are not used so as to prevent the substitution process from being repeatedly performed, and, thereby, a time spent on the substitution process can be reduced.

It should be noted that, in the above-mentioned embodiment, the threshold value (the predetermined number) n is set by a command supplied by the higher-order apparatus (a host computer) 200.

Figure 17:
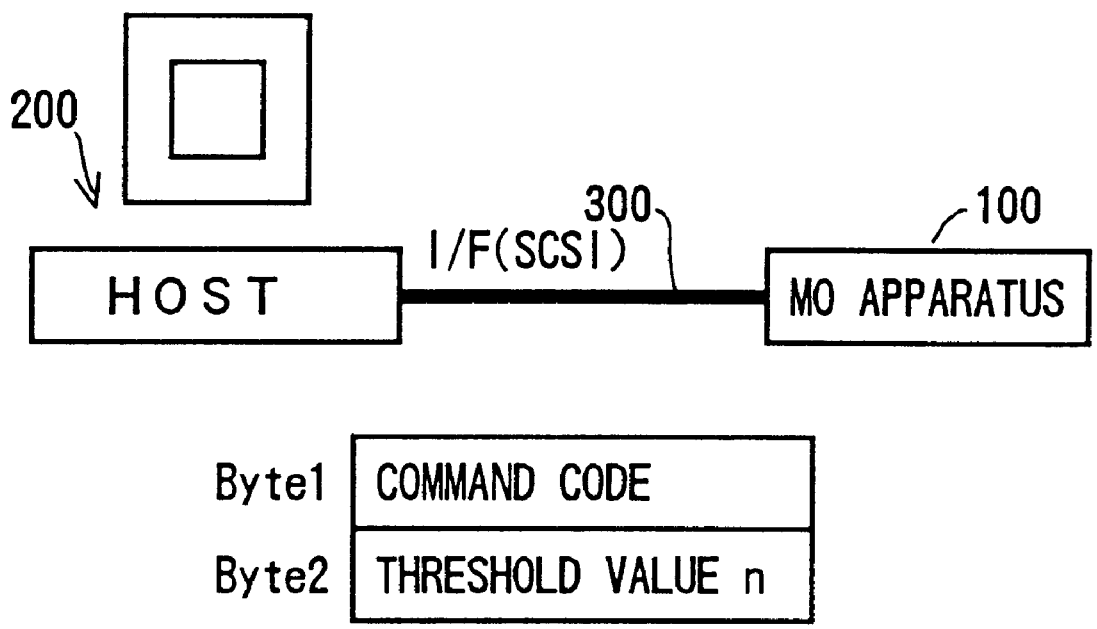
FIG. 17 is an illustration for explaining a command for setting a threshold value.

FIG. 17 is an illustration for explaining a method for setting the threshold value n. As shown in FIG. 17, a 2-byte command is supplied from the host computer 200 to the magneto-optical disk apparatus 100 through the SCSI interface 300. A first byte BYTE1 of the command supplied by the host computer 200 represents a command code, and a second byte BYTE2 represents the threshold value n.

The magneto-optical disk apparatus 100 sets the threshold value when the command is supplied from the host computer 200. The threshold value n is stored in a memory such as a DRAM until the power of the magneto-optical disk apparatus 100 is turned off. It should be noted that when the command is not supplied from the host computer 200, an initial value previously stored in a memory of the magneto-optical disk apparatus 100 may be used as the threshold value n. Alternatively, the threshold value may be automatically set in response to a type of the recording medium and an ambient temperature.

Figure 18:
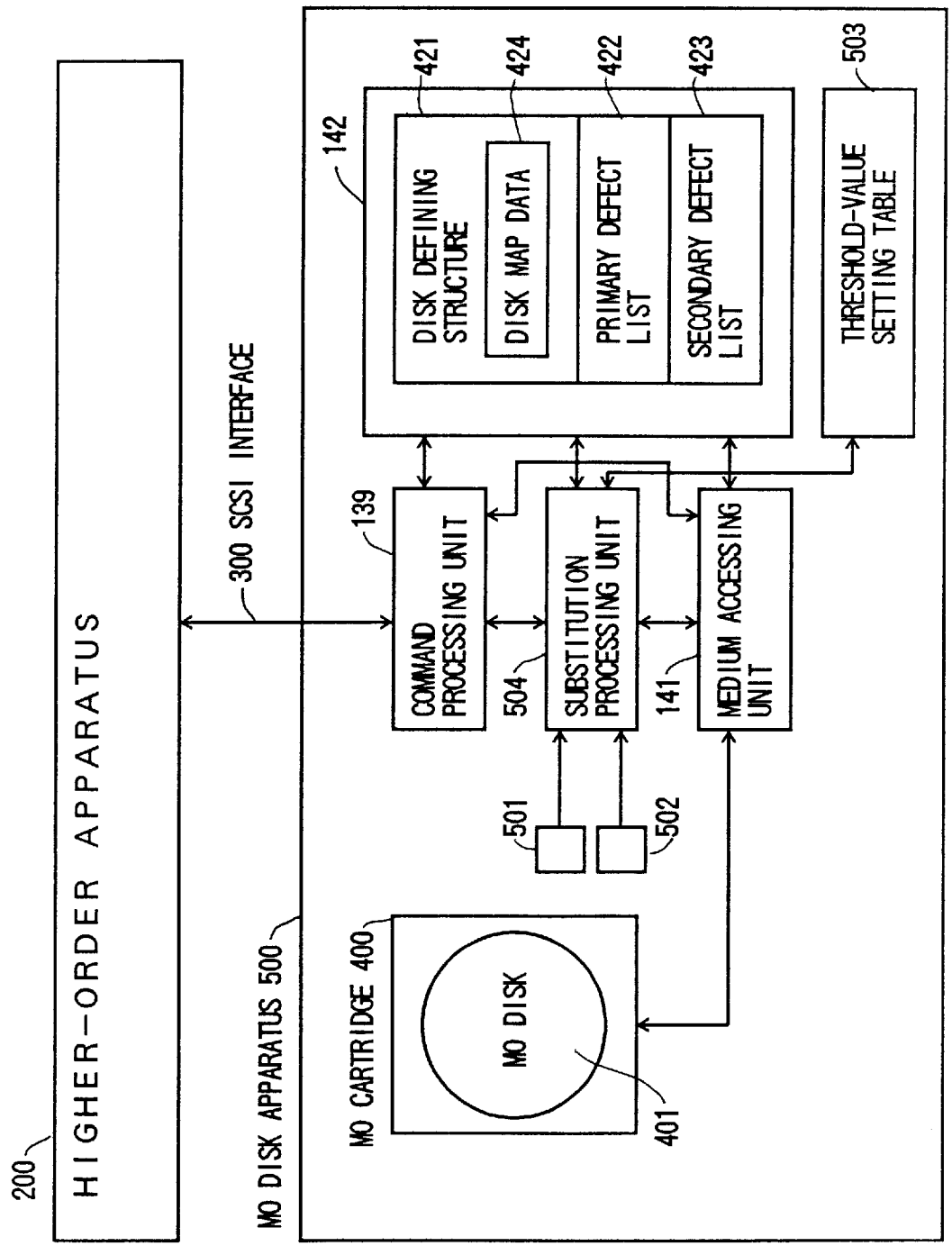
FIG. 18 is a functional block diagram of a magneto-optical disk apparatus according to a second embodiment of the present invention.

A description will now be given, with reference to FIG. 18, of a second embodiment of the present invention. FIG. 18 is a functional block diagram of a magneto-optical disk apparatus 500 according to the second embodiment of the present invention. In FIG. 18, parts that are the same as the parts shown in FIG. 4 are given the same reference numerals, and descriptions thereof will be omitted.

The magneto-optical disk apparatus 500 according to the present embodiment includes medium-type detecting unit 501 for detecting a type of medium, temperature detecting unit 502 for detecting an ambient temperature of the recording medium and a threshold-value setting table 503 in which a threshold value corresponding to the type of medium detected by the medium-type detecting unit 501 and an ambient temperature detected by the temperature detecting unit 502. Additionally, a substitution processing unit 504 according to the present embodiment reads a value from the threshold-value setting table 503 in accordance with the type of medium detected by the medium type detecting unit 501 and an ambient temperature detected by the temperature detecting unit 502 so as to set the threshold value n.

The medium-type detecting unit 501 is achieved by programs in the MPU 112. The type of medium can be discriminated by the MPU 112 detecting an interval of recorded pits. Additionally, the temperature detecting means 502 can be achieved by a temperature sensor 130.

FIG. 19 is an illustration for explaining the threshold-value setting table 503 according to the second embodiment of the present invention.

In the threshold-value setting table 503, threshold values n1 to n3, n11 to n13, n21 to n23, n31 to n33 and n41 to n43 are set for each combination of a type of medium and a temperature.

For example, when the medium-type detecting means 501 detects a medium type of 128 MB by reading a management area of the medium and when the temperature detecting unit 502 detects a low temperature, a value Ni is set to the threshold value n in the substitution processing unit 504. Additionally, when the medium-type detecting unit 501 detects a medium type of 540 MB and when the temperature detecting unit 502 detects an ambient temperature of the medium, a value N22 is set to the threshold value n in the substitution processing unit 504. Further, when the medium-type detecting unit 501 detects a medium type of 1.3 GB and when the temperature detecting means 502 detects a high temperature, a value N43 is set to the threshold value n in the substitution processing unit 504.

As mentioned above, in the present embodiment, a type of medium and an ambient temperature are detected by the medium-type detecting unit 501 and the temperature detecting unit 502, respectively, and a value corresponding to the detected type of medium and the detected ambient temperature is obtained from the threshold-value setting table 503. The thus-obtained value is set to the threshold value n to be set in the substitution processing unit 504. Thereby, an appropriate threshold value can be automatically set in response to a type of medium and an ambient temperature.

It should be noted that although the threshold value is set in response to a type of medium and an ambient temperature in the present embodiment, the factors used for setting the threshold value are not limited to the combination of the type of medium and the ambient temperature. Additionally, the number of factors for setting the threshold value is not limited to two, and only one factor or more than three factors may be used for setting the threshold value. Further, the type of medium is not necessarily defined by a capacity of the medium, and may be defined by a type of disk such as a magneto-optical disc, a phase-change optical disk or a DVD-RAM optical disk. Additionally, although a double mask RAD-MSR magneto-optical disk is used as a 1.3 GB optical disk in the above-mentioned embodiments, the present invention is not limited to such a disk and A FAD-MSR magneto-optical disk or a phase-change recording optical disk may be used.

The present invention is not limited to specifically disclosed embodiments, and variations and modifications may be made without departing from the scope of the present invention.

The present application is based on Japanese priority application No. 10-196012 filed on Jul. 10, 1999, the entire contents of which are hereby incorporated by reference.

What is claimed is:

1. An information storage apparatus adapted to store information on a recording medium having a plurality of recording zones, each of the recording zones being divided into a plurality of sectors, a substitutional area being defined in each of the recording zones to substitutionally store information when an error occurs in storing the information, said information storage apparatus comprising:

a defective sector detecting unit detecting a defective sector in each of the recording zones; and a control unit controlling an operation for storing information so as to store the information, when a number of defective sectors included in a first one of the recording zones is greater than a predetermined value, in the substitutional area of a second one of the recording zones other than the first one of the recording zones in which the information is to be stored;

wherein the predetermined number is smaller than a maximum number of defective sectors includable in the substitutional area.

2. The information storage apparatus as claimed in claim 1, wherein said defective sector detecting unit includes a recording-zone defective sector detecting unit detecting a number of defective sectors included in the first one of the recording zones other than the substitutional area, and said control unit stores the information, which is to be stored in the first one of the recording zones, in the substitutional area of the second one of the recording zones when the number of defective sectors detected by said recording-zone defective sector detecting unit is greater than the predetermined value.

3. The information storage apparatus as claimed in claim 1, wherein said defective sector detecting unit includes a substitutional-area defective sector detecting unit detecting a number of defective sectors included in the substitutional area of the first one of the recording zones, and said control unit stores the information, which is to be stored in the first one of the recording zones, in the substitutional area of the second one of the recording zones when the number of defective sectors detected by said substitutional-area detecting unit is greater than the predetermined value.

4. The information storage apparatus as claimed in claim 1, wherein said defective sector detecting unit includes a track defective sector detecting unit detecting a number of defective sectors included in a single track of the first one of the recording zones, and said control unit stores the information, which is to be stored in the first one of the recording zones, in the substitutional area of the second one of the recording zones when the number of defective sectors detected by said track defective sector detecting unit is greater than the predetermined value.

5. The information storage apparatus as claimed in claim 1, wherein said defective sector detecting unit includes a single-access defective sector detecting unit detecting a number of defective sectors generated during a single access to the first one of the recording zones, and said control unit stores the information, which is to be stored in the first one of the recording zones, in the substitutional area of the second one of the recording zones when the number of defective sectors detected by said single-access detecting unit is greater than the predetermined value.

6. The information storage apparatus as claimed in claim 1, wherein said defective sector detecting unit includes a consecutive defective sector detecting unit detecting a number of defective sectors consecutively generated in the substitutional area of the first one of the recording zones, and said control unit stores the information, which is to be stored in the first one of the recording zones, in the substitutional area of the second one of the recording zones when the number of defective sectors detected by said consecutive defective factor detecting unit is greater than the predetermined value.

7. The information storage apparatus as claimed in claim 1, wherein said defective sector detecting unit includes an initial defective sector detecting unit detecting a number of defective sectors included in the first one of the recording zones immediately after the recording medium is formatted, and said control unit stores the information, which is to be stored in the first one of the recording zones, in the substitutional area of the second one of the recording zones when the number of defective sectors detected by said initial defective sector detecting unit is greater than the predetermined value.

8. The information storage apparatus as claimed in claim 1, further comprising a medium-type detecting unit detecting a type of the recording medium, wherein said control unit sets the predetermined value in accordance with the type of the recording medium detected by said media-type detecting unit.

9. The information storage apparatus as claimed in claim 1, further comprising a temperature detecting unit detecting a temperature of atmosphere of the recording medium, wherein said control unit sets the predetermined value in accordance with the type of the recording medium detected by said temperature detecting unit.

10. The information storage apparatus as claimed in claim 1, further comprising a setting unit setting the predetermined value in accordance with an instruction supplied from an external apparatus.

* * * * *